United States Patent
Roberts (10) Patent No.: US 10,409,077 B2
(45) Date of Patent: Sep. 10, 2019

(54) DISTRIBUTED APERTURE HEAD UP DISPLAY (HUD)

(71) Applicant: Qioptiq Limited, St. Asaph (GB)

(72) Inventor: John Roberts, Mold (GB)

(73) Assignee: Qioptiq Limited, St. Asaph (GB)

(*) Notice: Subject to any disclaimer, the term of this patent is extended or adjusted under 35 U.S.C. 154(b) by 0 days.

(21) Appl. No.: 15/985,902

(22) Filed: May 22, 2018

(65) Prior Publication Data

US 2018/0341118 A1    Nov. 29, 2018

(30) Foreign Application Priority Data

May 26, 2017    (EP) .................................... 17173148

(51) Int. Cl.
G02B 27/10    (2006.01)
G02B 27/01    (2006.01)
G02B 27/14    (2006.01)

(52) U.S. Cl.
CPC ..... G02B 27/1066 (2013.01); G02B 27/0101 (2013.01); G02B 27/141 (2013.01); *G02B 2027/011* (2013.01); *G02B 2027/015* (2013.01); *G02B 2027/0114* (2013.01); *G02B 2027/0116* (2013.01); *G02B 2027/0123* (2013.01); *G02B 2027/0125* (2013.01); *G02B 2027/0196* (2013.01)

(58) Field of Classification Search
CPC .. G02B 27/01; G02B 27/0101; G02B 27/106; G02B 27/141; G02B 2027/0114; G02B 2027/0118; G02B 2027/0123; G02B 2027/0147
USPC ................. 353/630, 634, 94; 345/7, 8, 9, 22
See application file for complete search history.

(56) References Cited

U.S. PATENT DOCUMENTS

| 8,982,472 B2 * | 3/2015 | Lvovskiy ............... G02B 27/30 345/7 |
| 9,291,821 B1 * | 3/2016 | Lvovskiy ............... G02B 27/01 |

(Continued)

FOREIGN PATENT DOCUMENTS

| EP | 0305096 A2 | 3/1989 |
| EP | 2565700 A2 | 3/2013 |
| JP | H08122737 A | 5/1996 |

OTHER PUBLICATIONS

Extended European Search Report for Application 17173148.2 dated Oct. 25, 2017.

*Primary Examiner* — William C. Dowling
(74) *Attorney, Agent, or Firm* — Peter A. Nieves; Sheehan Phinney & Bass & Green PA (57) ABSTRACT

A head-up display includes a projector and an optical combiner configured to reflect light from the projector while allowing other wavelengths of light to pass through the optical combiner. The projector has two or more image sources, and two or more optical components, each of which is associated with a corresponding one of the image sources. In a typical implementation, the two or more optical components are closely situated to approximate an effective aperture that is larger than the actual aperture of either optical component. In such an implementation, since the actual aperture of each respective optical element is smaller than the larger effective aperture, it is generally much easier to correct for optical aberrations and the like, than it would be if a single optical element with a larger actual aperture were used.

13 Claims, 8 Drawing Sheets

(56) References Cited

U.S. PATENT DOCUMENTS

2013/0242404 A1\* 9/2013 Kobayashi ......... G02B 27/0101
　　　　　　　　　　　　　　　　　　　　　359/630
2016/0062113 A1　　3/2016 El-Ghoroury et al.
2017/0176744 A1\* 6/2017 El-Ghoroury ...... G02B 27/0101

\* cited by examiner

FIG. 8

DISTRIBUTED APERTURE HEAD UP DISPLAY (HUD)

CROSS-REFERENCE TO RELATED APPLICATIONS

This application claims priority to European application number 17173148.2 entitled Distributed Aperture Head up Display (HUD) and filed on May 26, 2017, which is incorporated by referenced herein in its entirety.

FIELD OF THE INVENTION

This disclosure relates to a head up display (HUD) and, more particularly, relates to a head-up display with a distributed aperture design.

BACKGROUND

A head-up display (HUD) makes an image (e.g., one that specifies vehicle speed, etc.) available on a transparent screen so that the image appears to be floating in space beyond the screen. When appropriately configured, the virtual image is combined with a real view of the world outside, as seen through the screen, so that the virtual image and the real world view appear to be at approximately the same distance.

When used in aircraft, for example, a HUD may enable a pilot to see flight information without having to look away from the world outside the aircraft and without having to refocus on flight instruments.

SUMMARY OF THE INVENTION

In one aspect, a head-up display includes a projector and an optical combiner configured to reflect light from the projector while allowing other wavelengths of light to pass through the optical combiner. The projector has two or more image sources, and two or more optical components, each of which is associated with a corresponding one of the image sources. In a typical implementation, the two or more optical components are closely situated to approximate an effective aperture that is larger than the actual aperture of either optical component. In such an implementation, since the actual aperture of each respective optical element is smaller than the larger effective aperture, it is generally much easier to correct for optical aberrations and the like, than it would be if a single optical element with a larger actual aperture were used.

In some implementations, each of the images sources is configured to produce an image that is substantially the same, in substance at least (if not in format, too), as the image or images being produced by any other image sources in the HUD. Moreover, in some such implementations, the optical components are configured to direct light from the image sources toward the optical combiner in such a manner that one single image (which may include one or more pieces of information or graphical elements), viewable by a human user, will be produced (or will appear) beyond the optical combiner by virtue of the light being reflected at the optical combiner. Additionally, the one single image that is produced by virtue of the light being reflected at the optical combiner typically is substantially the same, in substance at least (if not in format too), as the image produced by one or more (or all) of the image sources. The one single image that is produced by virtue of the light being reflected at the optical combiner is generally viewable in an instantaneous field of view (iFoV) associated with the head-up display from an eye box associated therewith.

In some implementations, each of the image sources may be configured to produce an image that is, in at least some manner, different in substance from the image or images produced by the one or more other image sources. Thus, the image sources don't necessarily have to produce the same image. In general, having the same image presented by each lenslet would help ensure that the same image was visible irrespective of head position in the eyebox of the HUD, however, this is not a requirement.

Moreover, the single image that is produced by virtue of the light being reflected at the optical combiner may be substantially the same, in substance at least (if not in format too), to an image that would be produced by a head-up display with a single image source and a single optical component that has a larger aperture than either of the two or more optical components.

In some implementations, the projector has exactly two image sources and exactly two optical components. Of course, these numbers may be something other than two as well.

According to certain implementations, each respective one of the optical components has an aperture that is substantially the same as the one or more other optical components. However, according to alternative implementations, one or more of the optical components may have an aperture that is different than the one or more other optical components. Moreover, each lenslet could, in theory, have a different aperture size and design; and provided the area covered is the same, it would give a similar effect to the case in which all of the lenslets are identical. In fact, in some implementations, all of the optical components in a particular HUD may be different/unique.

Moreover, in some implementations, each one of the image sources is configured to produce an image in an image plane of the corresponding one of the optical components. The image sources can be virtually any kind of image sources and can include, for example, a cathode ray tube, a solid-state light source, a scanning laser, a micro-display image source, a liquid crystal on silicon (LCoS) display, a digital micro-mirror (DMD), and/or an organic light-emitting diode (OLED), etc.

In some implementations, each one of the optical components is a lens (e.g., one or more pieces of transparent and/or reflective material(s) configured to perform an optical function).

Typically, the optical components are arranged side-by-side relative to one another. Moreover, typically, the optical components are very close to each other.

The optical combiner may form or be in front of a windshield of a vehicle or a face shield of a helmet, for example.

In some implementations, one or more of the following advantages are present.

For example, a HUD may be provided that produces a very high quality image, with a relatively large instantaneous field of view and eye box. The HUD may be able to accomplish this with a relatively simple configuration, with minimal or very little need to correct for optical aberrations (e.g., chromatic aberrations etc.), which can become difficult and complex to correct.

The HUD may be easily adapted for installation in tight and highly constrained spaces (e.g., the cockpit of a plane, etc.). In many cases, the space envelope available for a HUD is constrained by a number of parameters that bound where (e.g., in a cockpit of an airplane) the HUD may fit. These parameters may include, for example, the location of the canopy, the observer distance/position, the position of the image source, an ejection line, a sight over nose line, etc. The HUD disclosed herein is generally able to fit into such places with relative ease.

In various implementations, the concepts and/or technologies disclosed herein could be advantageously applied to enable fuller use of color in HUDs. In some implementations, in fact, full color, or at least close to full color, HUDs may become commercially feasible by applying one or more of the concepts disclosed herein. High performance may be achieved in terms of dipvergence, divergence, convergence, range, and/or waveband, etc.

The HUD smaller optical components may replicate or approximate the instantaneous field of view (iFoV) and eye box of a much larger lens. Generally speaking, an iFoV relates to how big the HUD imagery appears or seems to be. The eye box generally relates to where the viewer can put his or her head and still see the HUD imagery.

Other features and advantages will be apparent from the description and drawings, and from the claims.

BRIEF DESCRIPTION OF THE DRAWINGS

Similar reference numerals refer to similar elements.

DETAILED DESCRIPTION

Figure 1:
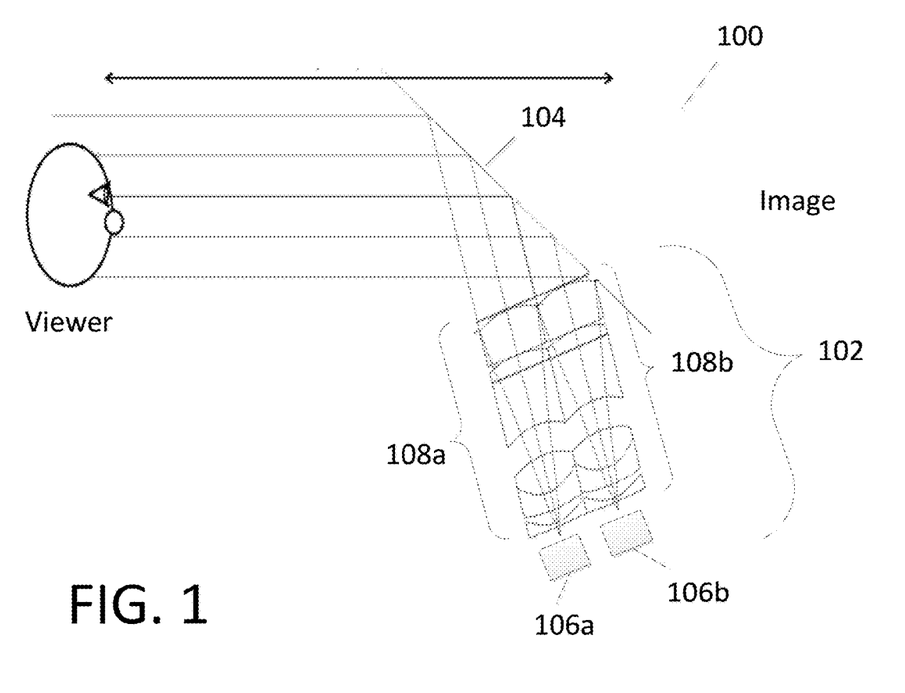
FIG. 1 is a schematic side view representation of an exemplary head-up display (HUD).

FIG. 1 is a schematic side view representation of an exemplary head-up display (HUD) 100.

Generally speaking, the HUD 100 is an optical system that includes a transparent display configured to present an image (e.g., one that contains data such as speed, altitude, etc.) without requiring a viewer (e.g., a pilot, etc.) to look away from his or her usual viewpoints (e.g., looking through the windshield). With the HUD 100, the viewer can look through the transparent display (e.g., a windshield or a face shield) to his or her surrounding environment and, without having to divert his or her eyes, see one or more pieces of instrument data, for example, on display where his or her eyes are focused. The viewer, therefore, can easily understand and monitor both his or her surrounding environment and instrument data, for example, without having to move his or her eyes and/or refocus between outside (e.g., past the windshield) and optically closer data instruments (e.g., on a separate dashboard).

The HUD 100 can be in a vehicle (such as an airplane or an automobile), or can be configured to move with the viewer's head (e.g., as a helmet-mounted display (HMD)). Some pilots, for example, may use HUDs and HMDs at the same time. Of course, the HUD 100 can be used in many different applications.

The HUD 100 has a projector 102 and an optical combiner 104. The projector 102 is a device that is configured to project light (i.e., an image) toward the optical combiner 104. The optical combiner 104 is a device that is configured to reflect the light from the projector 102, while allowing light having a different wavelength than the image light to pass through it. In this regard, the optical combiner 104 may have a coating that substantially reflects the wavelength(s) of light produced by the projector 102, but does not reflect other wavelengths of light. These other wavelengths of light, therefore, may simply substantially pass through the optical combiner 104. So if, for example, the projector 102 is configured to project a green light image, then the optical combiner 104 (either on its own or by virtue of a coating applied thereupon) may be configured to reflect the green light, but be at least partially or substantially transparent to most, if not all, other (non-green) wavelengths of light.

In some implementations, the optical combiner 104 is configured to reflect 100% of light from the HUD projector, but this is not required. The reflectance of the optical combiner 104 in this regard generally may depend on the brightness of the HUD and whether the introduction of any stray light into the cockpit, for example, is acceptable. In some implementations, for example, a 70% reflectance may be acceptable.

The projector 102 in the illustrated implementation has two image sources 106a, 106b and two optical components 108a, 108b, one for each of the image sources 106a, 106b. In the illustrated implementation, the image sources 106a, 106b are arranged side-by-side relative to each other and the optical components 108a, 108b are arranged side-by-side relative to each other. Each optical component 108a, 108b is associated with (and configured to receive light from) a respective one of the image sources 106a, 106b. More particularly, in the illustrated implementation, optical component 108a is configured to receive light from image source 106a, and optical component 108b is configured to receive light from image source 106b. Even more particularly, each optical component 108a, 108b is configured relative to its associated image source 106a, 106b, such that whatever image is being produced by its image source ends up being focused in an image plane of the optical component.

In a typical implementation, the optical components 108a, 108b are very close to one another. In fact, in a typical implementation, the optical components 108a, 108b (or at least their housings) may be in direct physical contact with one another. Likewise, in a typical implementation, the image sources 106a, 106b are very close to one another. In fact, in a typical implementation, the image sources 106a, 106b (or at least their housings) may be in direct physical contact with one another. The configuration of each image source 106a, 106b to its corresponding optical component 108a, 108b may be substantially identical in each respective pair of associated image source and optical component.

The image sources 106a, 106b can be (or include) virtually any kind of device or technology that is able to produce an image that can be projected. Some examples are cathode ray tubes, solid-state light sources (e.g., light emitting diodes) modulated by liquid crystal display (LCD) screens, scanning lasers, micro-display imaging technologies (based on liquid crystal displays (LCDs)), liquid crystal on silicon (LCoS) devices, digital micro-mirrors (DMDs), and/or organic light-emitting diodes (OLED) technologies). The image sources 106a, 106b can be implemented using two separate devices. Alternatively, the image sources can be implemented using one device that is capable of producing two separate images—one for each optical element 108*a*, 108*b*. In a typical implementation, each image source 106*a*, 106*b* is operable to produce an image that is substantially the same in substance at any point in time as any other image(s) being produced by the other image source(s) in the system 100. For example, at a given point in time, both image sources 106*a*, 106*b* may be producing the image "400 mph," to represent a vehicle speed of 400 miles per hour, and, at a later point in time, simultaneously, change to produce the image "410 mph," to represent a vehicle speed of 410 miles per hour.

The image that ends up being viewable by the viewer may be formed from some light that originated at a first one of the image sources (e.g., 106*a*) and some light that originated from a second one of the image sources (e.g., 106*b*).

The single image being produced by the HUD 100 at any given point in time can vary in complexity from a relatively simple image (e.g., "400 mph"—just one piece of data) to a significantly more complex image—with multiple pieces of data (e.g., vehicle speed, wind speed, altitude, etc.). A more complex image may even include a full raster (video) that represents, for example, imagery captured by an image intensifier or thermal camera located on or within the vehicle or otherwise associated with the HUD 100. Moreover, although, in some implementations, all of the images are generally substantially the same in substance (e.g., all will show vehicle speed, and/or all will show altitude, and/or all will show wind speed, etc.), the different images may be (though need not be) different in format (e.g., color, size, etc.).

The optical components 108*a*, 108*b* can be virtually any kind of optical components. Generally speaking, the optical components 108*a*, 108*b* are devices that are configured to direct the images produced by the image sources 106*a*, 106*b* toward the optical combiner 104. The image sources 106*a*, 106*b* are generally positioned at a focal point (or in the focal plane) of the optical components 108*a*, 108*b*. More particularly, in a typical implementation, such as the one shown in FIG. 1, each optical component 108*a*, 108*b* is configured to direct the image that is produced by a corresponding one of the image sources 106*a*, 106*b* toward the optical combiner. Moreover, in a typical implementation, the images are directed in such a manner that a single image (that is substantively identical or similar) to the original image(s), and that actually may be a composite replication of the images being produced by the image sources 106*a*, 106*b* that is viewable by a viewer looking at or through the optical combiner 104.

In a typical implementation, each optical component 108*a*, 108*b* is (or has) a lens. In general terms, a lens can be thought of as an object that performs an optical function. In this regard, the lens may have one or more optical elements. In a typical implementation, at least part of the optical function(s) performed by each optical component 108*a*, 108*b* includes directing light from a corresponding one of the image sources 106*a*, 106*b* toward the optical combiner 104. Moreover, in a typical implementation, the optical components do this in a manner such that one image appears to the viewer (that is substantially identical to or a composite of the images produced by the image sources). In some implementations, the optical function(s) performed by each optical element further includes collimating the light from its corresponding image source. This may help replicate the image from the corresponding image source 106*a*, 106*b* at a position perceived to be infinity through the optical combiner 104 with little or no parallax. In a typical implementation, each optical component 108*a*, 108*b* is physically substantially similar to the other optical component(s) in the HUD 100. Moreover, typically, the optical components are arranged such that their respective optical axes are substantially parallel to one another.

The optical combiner 104 is generally an angled, substantially flat or contoured, piece of transparent material (e.g., glass or plastic) located directly in front of the viewer (e.g., the pilot, vehicle driver, or helmet wearer). The optical combiner 104 is generally configured to redirect (e.g., reflect) the projected image from the projector 102 in such a way that the viewer will be able to see the field of view and the projected image (perceived to be at infinity) at the same time. The optical combiner 104 can be virtually any kind of optical combiner. In some implementations, the optical combiner 104 may have a special coating that reflects the light (which may be monochromatic) from the projector 102, while allowing all, or at least some, other wavelengths of light to pass through it. In some implementations, the optical combiner 104 has a curved surface to refocus the image from the projector 102.

In a typical implementation, the system includes a computer (e.g., a video generation computer, not shown in FIG. 1) that provides an interface between the HUD 100 and any system(s) (e.g., sensors, etc.) that produce the data to be displayed by the HUD 100. The system(s) that produce the data to be displayed can include various types of data monitors including, for example, speedometers, altimeters, etc.

The HUD 100 is generally is configured to produce a single image, which may contain several different pieces of data or elements, that is viewable through the optical combiner in an instantaneous field of view (iFoV) of the head-up display from an eye box associated therewith. The phrase "eye box" should be understood generally as referring to a three-dimensional space from which all of the data being reflected by the optical combiner 104 toward the viewer can be seen. Moreover, the phrase iFoV should be considered to be generally referring to the union of the two solid angles subtended at each eye (of the viewer) by the clear aperture(s) of the HUD optics from a fixed head position within the HUD eye box. Thus, the iFoV may be comprised of what the left eye sees plus what the right eye sees from a fixed head position within the HUD eye box.

The HUD 100 may be considered a distributed aperture HUD—that is, a HUD with more than one aperture. In optics, the term aperture refers generally to an opening or path through which light can travel. Generally speaking, the larger the aperture, the more light can pass; and the smaller the aperture, the less light can pass. The portion of incident light that travels through a particular optical element (e.g., each of 108*a*, 108*b* in FIG. 1) may be determined, at least in part, by its aperture. Moreover, the amount of light that can travel through two (or more) optical elements (e.g., the two optical components 108*a*, 108*b* in FIG. 1) may be determined, at least in part, by the effective aperture of the two (or more) optical elements 108*a*, 108*b* in the HUD 100 collectively.

In this regard, the two (or more) optical components 108*a*, 108*b* in the illustrated HUD 100 collectively allow more light to pass than any one of those optical components 108*a*, 108*b* would allow if that one optical component were by itself. Moreover, in the illustrated HUD 100, all of the light that passes through both of the optical components 108*a*, 108*b* contributes to creating a single image that is produced by the HUD 100. Therefore, it can be said that the effective aperture of the two (or more) optical components 108a, 108b—that allows the passage of light to create the single HUD image—is greater than the actual aperture of either one of the individual optical components 108a, 108b.

In some ways, the two (or more) optical components 108a, 108b in the HUD 100 act like a single, larger aperture optical element, but, do so using two (or more) smaller aperture optical elements 108a, 108b. Thus, in a typical implementation, the collective effective aperture of the two (or more) optical components 108a, 108b may be comparable to the actual aperture of a single larger optical component. Since the actual aperture of each respective optical element 108a, 108b is smaller than the larger effective aperture of the collective optical elements 108a, 108b, it is generally much easier to correct for (or minimize) optical aberrations, and the like, than it would be if, for example, a single optical element with a larger actual aperture were used.

In a typical implementation, the single image that is produced by the HUD 100 (and is viewable by a viewer through the optical combiner 104) may be identical in substance—but potentially superior in quality—to an image that would be produced by a similar system if that system included only a single image source and a single optical component with a larger aperture than either of the two optical components shown. In a typical implementation, the aperture of each of optical components 108a, 108b is substantially identical to the aperture of every other optical component 108a, 108b in the HUD. Moreover, in a typical implementation, even though the HUD 100 has two (or more) separate image source/optical component pairs, it may be simpler (optically and/or electronically) than a comparable HUD having only one image source/optical component pair because the need to correct for (or minimize) aberrations is generally lower in HUD 100. In some implementations, it may be preferable to provide a system that is, optically speaking, comparable to a larger single aperture HUD, but that offers other benefits, such as reduced size, mass, cost etc.

Figure 2:
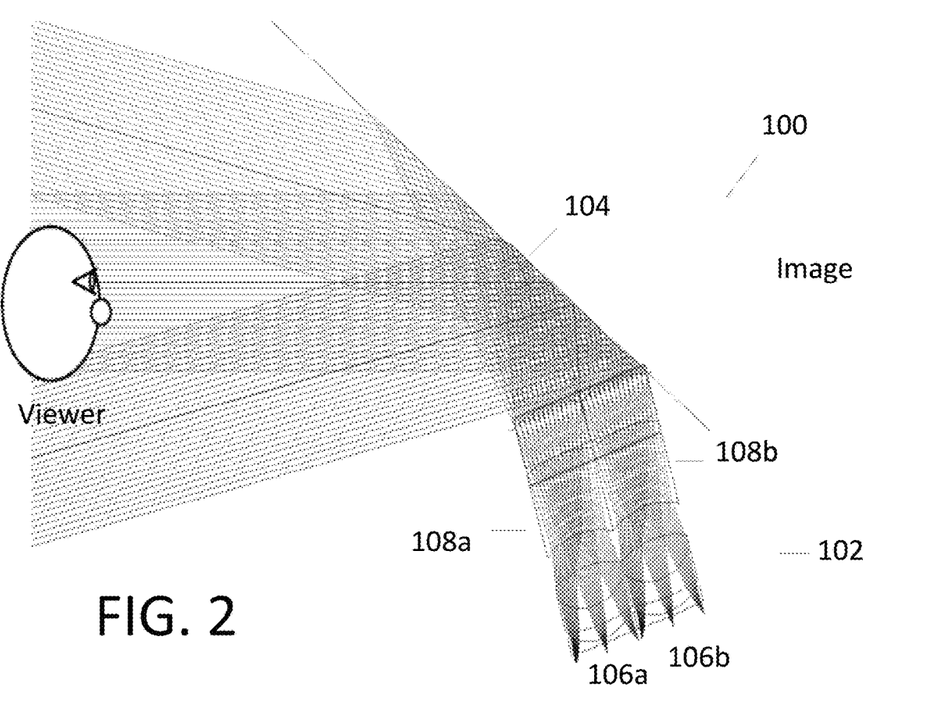
FIG. 2 is a schematic side view representation of the exemplary HUD from FIG. 1.

FIG. 2 is a schematic side view representation of the exemplary head-up display (HUD) 100 from FIG. 1, showing the path taken through the a portion of the HUD 100 by bundles of light rays that originate, respectively, at the top (T) portion, middle (M) portion, and bottom (B) portion of each image source 106a, 106b. The viewer, when his or her head is positioned as shown, is able to clearly see the light rays from the middle (M) portion of the image sources. In a typical implementation, the viewer, from where he or she is positioned, may also be able to view some portion of the total field of view. However, in order to more clearly see the light rays from the top (T) portion of the image sources, the viewer might raise his or her head and/or lean forward a bit. Similarly, in order to more clearly see the light rays from the bottom (B) portion of the image sources, the viewer might lower his or her head and/or lean forward a bit.

Figure 3:
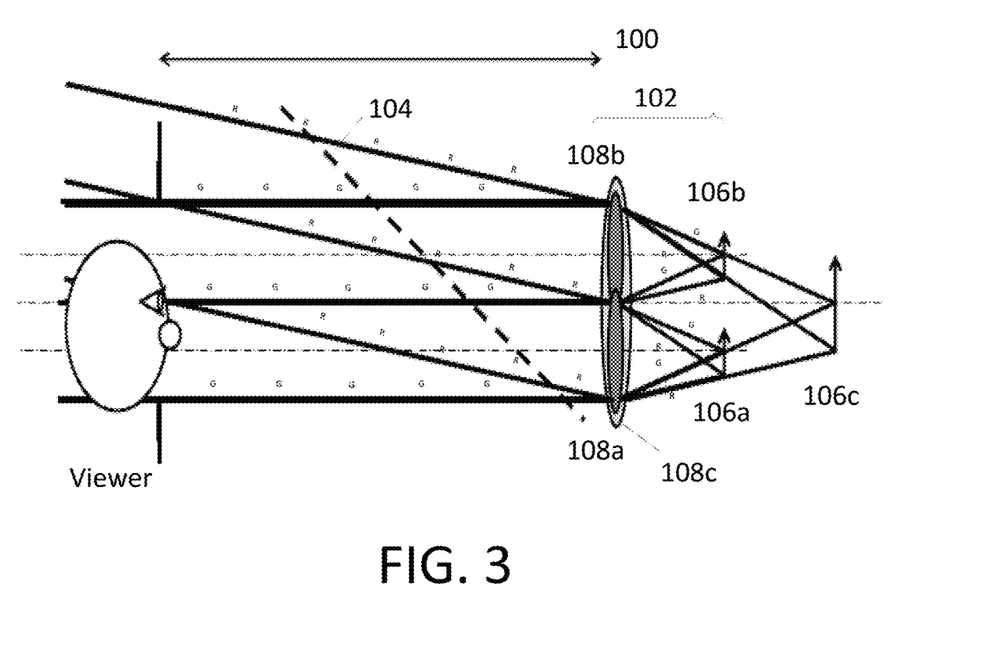
FIG. 3 is a side view, schematic representation that compares (in one drawing) two different HUD designs.

FIG. 3 is a side view, schematic representation that compares (in one drawing): A) a first HUD design that includes two smaller image sources 106a, 106b and two smaller aperture optical components 108a, 108b, with B) a second HUD design that has only a single larger image source 106c and a single larger aperture optical element 108c. In the illustrated implementation, the optical combiner is labeled as 104, and the viewer is labeled as such.

Although the image sources 106a, 106b and 106c and the optical components 108a, 108b and 108c are shown on an opposite side of the optical combiner 104 from the viewer, in most instances, these components would be on the same side of the optical combiner 104 as the viewer (e.g., arranged as shown in FIGS. 1 and 2), and, in those instances, the rays of light would travel from the optical combiner 104 toward the viewer along substantially the same kind of paths as illustrated in FIG. 3.

The light rays that originate at the bottom of each of the two smaller image sources (arrows) 106a, 106b, are marked with an "R" for red, whereas the light rays that originate at the top of each of the two images (arrows) is marked with a "G" for green—indicating a color-coding of these ray lines.

FIG. 3 essentially illustrates that one can achieve a large effective aperture with two (or more) optical components that have comparably smaller actual apertures. The optical function of the two comparably smaller aperture optical components would be substantially similar to the single comparably larger aperture optical component, without as pronounced a need to correct for optical aberrations. The resulting HUD, in a typical implementation, has a large eye box and a large instantaneous field of view, both of which are desirable traits. This type of system lends itself well to ease of design and represents overall a very useful design configuration.

Figure 4:
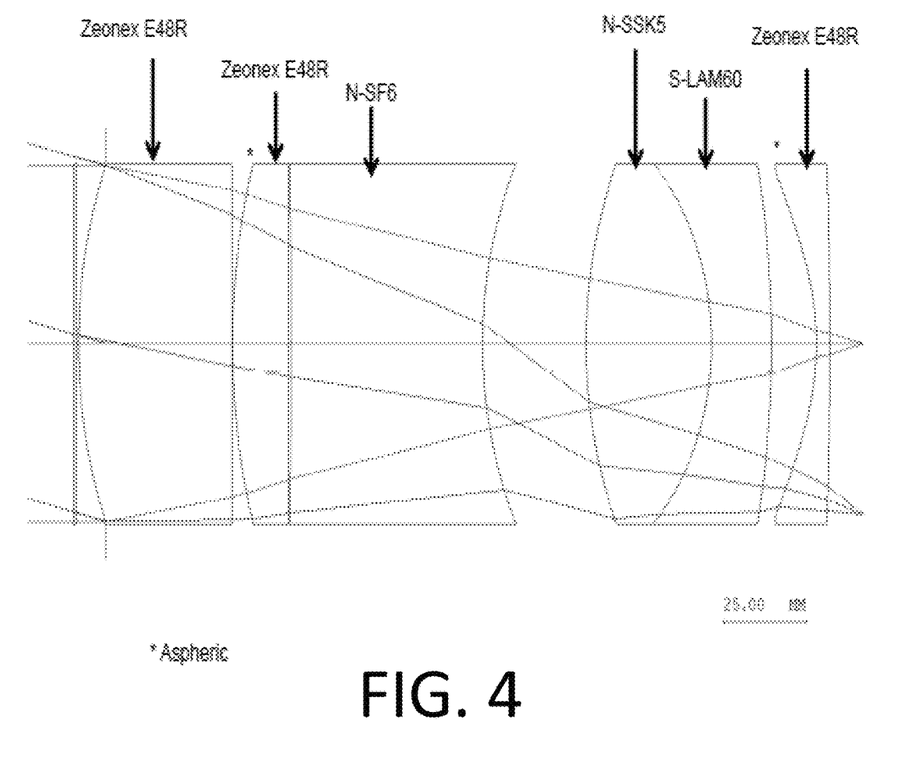
FIG. 4 is a schematic side view showing an arrangement of an exemplary optical component.

FIG. 4 is a schematic side view showing an arrangement of an exemplary optical component. The illustrated arrangement is similar to the arrangement represented in the HUD 100 of FIG. 1.

The illustrated arrangement includes a series of optical elements, namely, from left to right, a transparent (e.g., glass) cover, a first Zeonex® E48R element, a second (aspheric) Zeonex® E48R element, an N-SF6, an N-SSK5 element, an S-LAM60 element, and a third (aspheric) Zeonex® E48R element. Each optical element is contoured as shown, with at least the concave left-facing surface of the third Zeonex E48R element and the convex left-facing surface of the second Zeonex E48R element being aspheric.

The illustrated arrangement is exemplary only and may have more, fewer, or just different optical elements and the physical configuration, or contours, of each optical element in the optical component can vary considerably.

Figure 5:
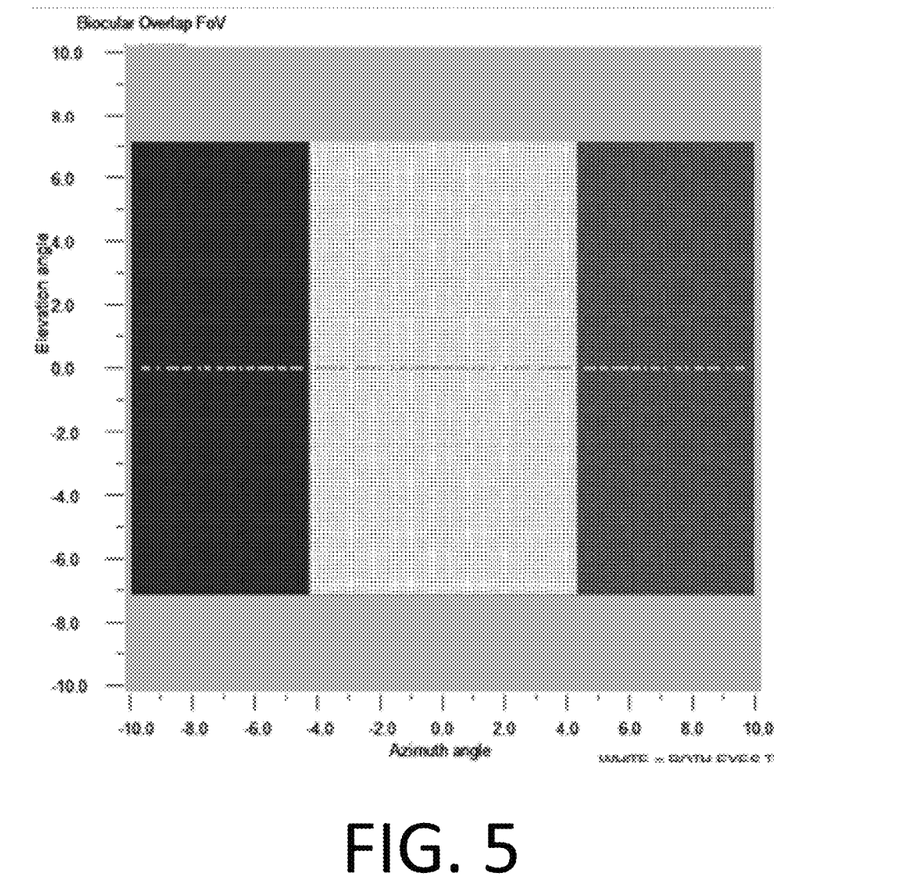
FIG. 5 is a plot of azimuth angle vs. elevation angle for an exemplary HUD, such as the one in FIG. 1.

FIG. 5 is a plot of azimuth angle vs. elevation angle for an exemplary HUD, such as the one in FIG. 1. The illustrated representation includes binocular overlap in the exemplary HUD.

The abscissa (x-axis) in the illustrated plot represents azimuth angle and ranges from −10.0 to 10.0 degrees. The ordinate (y-axis) in the illustrated plot represents elevation angle and ranges from −10.0 to 10.0 degrees.

The left side portion 550 of the plot corresponds to the left eye vignetted and the right eye transmitted. The right side 552 portion of the plot corresponds to the right eye vignetted and the left eye transmitted. The center portion 554 of the plot corresponds to both sides transmitted. The outer border 556 (top and bottom) of the plot corresponds to no rays transmitted.

According to the illustrated implementation, the effective exit aperture is rectangular (e.g., due to lens profile/tessellation), hence the instantaneous field of view (iFoV) for either eye is also rectangular.

Figure 6:
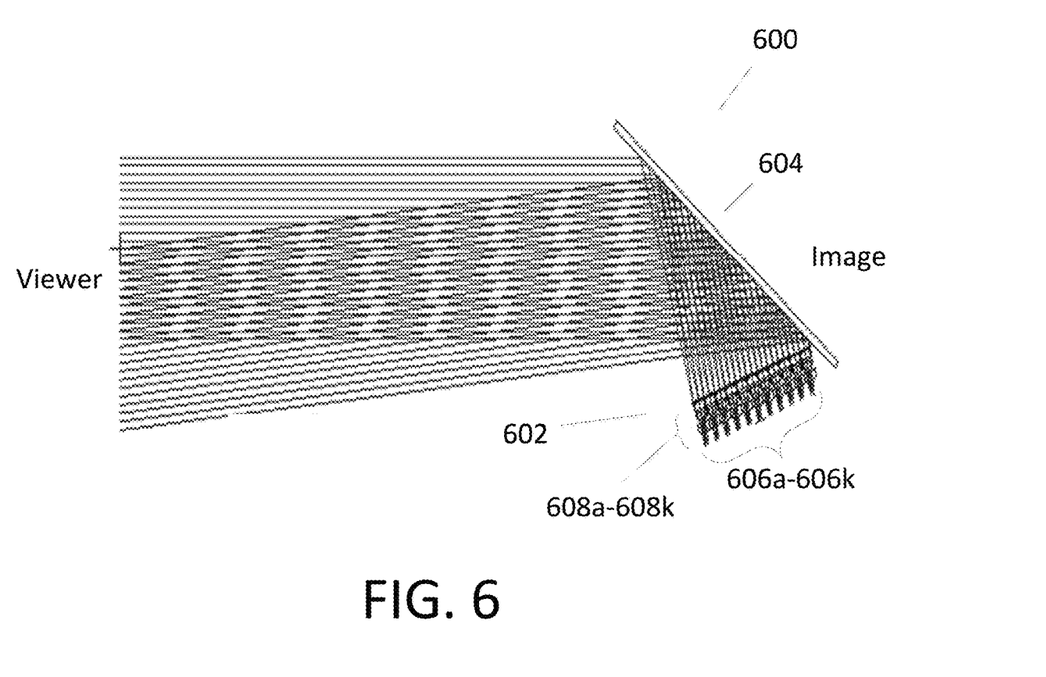
FIG. 6 is a schematic side view representation of an alternative exemplary head-up display (HUD).

FIG. 6 is a schematic side view representation of an exemplary head-up display (HUD) 600.

The HUD 600 in FIG. 6 is similar to the HUD in FIG. 1, the main exception being that the HUD 600 in FIG. 6 has a projector 602 with eleven image sources 606a-606k and eleven optical components 608a-608k, one for each of the image sources.

The HUD 600 also has an optical combiner 604. The projector 602 is configured to project light (i.e., an image) toward the optical combiner 604. The optical combiner 604 is configured to reflect the light from the projector 102, while allowing light having a different wavelength than the image light to pass through it.

Generally speaking, a HUD can include virtually any number (two or more) of light projectors.

Generally speaking, it is desirable for adjacent optical components (e.g., 108a, 108b) in a HUD to be close together. In some implementations, there may be no gap between adjacent optical components. In other implementations, there may be a gap, but, in those implementations, the HUD should be considered usable if the gap between adjacent optical components is smaller than the eye of the viewer's pupil (e.g., less than 3 millimeters).

Figure 7:
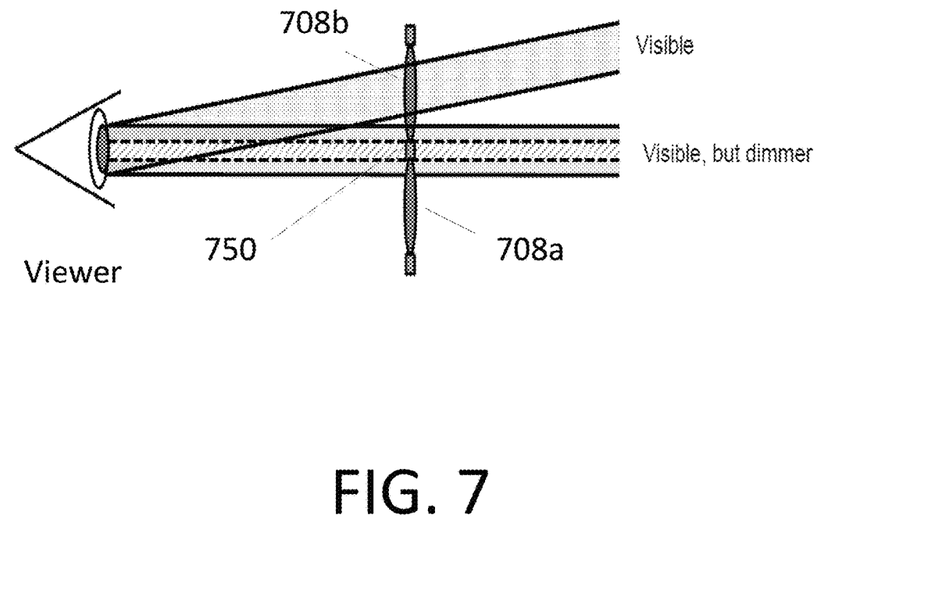
FIG. 7 is a schematic side view of an example of a small gap between adjacent optical components in a HUD.

FIG. 7 represents an example of a small gap 750 (e.g., under 3 millimeters) between adjacent optical components 708a, 708b in a HUD. The gap 750 in the illustrated implementation may produce a visual effect in the HUD imagery (e.g., the virtual image that is visible through the optical combiner) that is comparable to looking at a distant panorama through a wire fence. Notably, this effect would only impact the HUD imagery; the view of the outside world would be unaffected. Moreover, the entire field of view would generally be viewable in the illustrated implementation, but some areas (e.g., in the "visible, but dimmer" band") may be reduced in relative brightness. Additionally, generally speaking, the effect may become less objectionable as the obscurations reduce in size.

Figure 8:
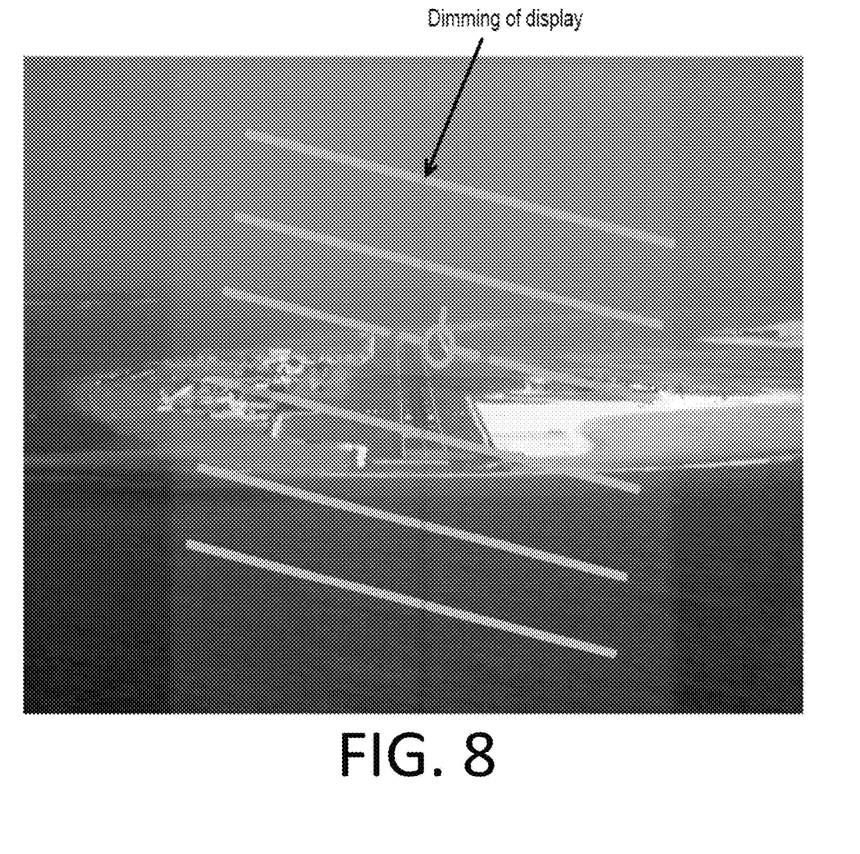
FIG. 8 is a rendering of the effect of a gap between adjacent optical components on the appearance of HUD imagery at the viewer's eyes when focused at infinity while looking through the optical combiner to the world beyond.

FIG. 8 is a rendering of this effect when the viewer's eyes are focused at infinity while looking through the optical combiner to the world beyond. The illustration shows a slight dimming of display that occurs at a centerline of the HUD imagery, which would correspond to a gap between adjacent optical components in the HUD. However, the slight dimming is very minor in nature and certainly not problematic. Notably, the visibility of the outside world in the illustrated implementation is not negatively impacted by the slight dimming of the HUD imagery.

A number of embodiments of the invention have been described. Nevertheless, it will be understood that various modifications may be made without departing from the spirit and scope of the invention.

For example, the optical components (e.g., lenses) could be made shorter. Generally speaking, shorter optical components mean shorter focal lengths, which may correspond to faster optical components. As with longer optical components, the same effective aperture as a single lens HUD may ensure a comparable eye box and iFoV. In some implementations, making a lens shorter with the same aperture may trade display size and mass for waveband and complexity. Such implementations may provide similar performance to legacy HUDs in smaller spaces.

The concepts disclosed herein are not limited to any particular subdivision of the aperture. The subdivision could be a single subdivision (e.g., in each direction). Alternatively, the HUD could have many small optical components (e.g., lenses). Moreover, the optical component (e.g., lenslet) apertures may be any shape(s) (e.g., tessellating shape(s)) including, for example, rectangular or hexagonal.

The lenslets may have a similar focal length to other types of HUD designs (e.g., 170 mm), or they may have a different focal length(s), driven by the requirements of the design.

Whilst the implementations described comprise similar lenslets, this is not explicitly required. The subdivision of the effective aperture ultimately does not necessarily require that the optical components (e.g. lenslets) be identical in their individual sizes and/or apertures. That is, as long as the effective aperture is maintained, the distributed aperture HUD may comprise lenslets of different size, shape and design.

The HUD may be configured to produce HUD imagery in green, in which case, the surface coating of the optical combiner will be configured to reflect green. In other implementations, the HUD may be configured to produce HUD imagery in another color (or in multiple colors, in which case, the surface coating of the optical combiner will be appropriately reflective.

In some implementations (e.g., aircraft avionics systems), the HUD may be configured to operate from dual independent redundant computer systems. Such a HUD may receive input directly from sensors (e.g., pitot-static, gyroscopic, navigation, etc.) aboard the aircraft and perform their own computations (with an onboard processor) rather than receiving previously computed data from flight computers, for example.

In some implementations (e.g., aircraft), a HUD display may include one or more of (or all of) airspeed, altitude, a horizon line, heading information, turn/bank and/or slip/skid indicators, etc. Other symbols and data may be available in some HUDs including, for example, a boresight or waterline symbol (is fixed on the display and shows where the nose of the aircraft is actually pointing), a flight path vector (FPV) or velocity vector symbol (shows where the aircraft is actually going, the sum of all forces acting on the aircraft), an acceleration indicator or energy cue, an angle of attack indicator, and/or navigation data and/or symbols.

In addition, some military application HUDs may include weapons system and sensor data such as: target designation (TD) indicator, range (e.g., to target, waypoint, etc.), weapon seeker or sensor line of sight (shows where a seeker or sensor is pointing), weapon status (includes type and number of weapons selected, available, arming, etc.).

These displays may be included, for example in a car HUD: speedometer, tachometer, and navigation system information, etc.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted and/or described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It should be understood that relative terminology used herein, such as "upper", "lower", "above", "below", "front", "rear," etc. is solely for the purposes of clarity and is not intended to limit the scope of what is described here to require particular positions and/or orientations. Accordingly, such relative terminology should not be construed to limit the scope of the present application.

Additionally, the term substantially, and similar words, such as substantial, are used herein. Unless otherwise indicated, substantially, and similar words, should be construed broadly to mean completely or almost completely or very nearly, or to within normal manufacturing tolerances as would be recognized by a person having ordinary skill in the art.

Other implementations are within the scope of the claims.

What is claimed is:

1. A head-up display comprising:
   a projector comprising:
      two or more image sources arranged side-by-side; and
      two or more optical components arranged side-by-side, each of which is associated with a corresponding one of the image sources, and comprises a lens and a substantially parallel optical axis configured to collimate and direct the images produced by the corresponding one of the image sources toward an optical combiner; and
   the optical combiner configured to reflect wavelengths from the projector while allowing other wavelengths of light to pass through the optical combiner.

2. The head-up display of claim 1, wherein each of the images sources is configured to produce an image that is substantially the same, in substance at least, as the image or images produced by the one or more other image sources.

3. The head-up display of claim 1, wherein each of the image sources is configured to produce an image that is, in at least some manner, different in substance from the image or images produced by the one or more other image sources.

4. The head-up display of claim 2, wherein the optical components are configured to direct light from the image sources toward the optical combiner in such a manner that one single image, viewable by a human user, is produced by virtue of the light being reflected at the optical combiner.

5. The head-up display of claim 4, wherein the one single image that is produced by virtue of the light being reflected at the optical combiner is substantially the same, in substance at least, as the image produced by each respective one of the image sources.

6. The head-up display of claim 4, wherein the one single image that is produced by virtue of the light being reflected at the optical combiner is viewable in an instantaneous field of view associated with the head-up display from an eye box associated therewith.

7. The head-up display of claim 4, wherein the single image that is produced by virtue of the light being reflected at the optical combiner is substantially the same, in substance at least, to an image that would be produced by a head-up display with a single image source and a single optical component that has a larger aperture than either of the two or more optical components.

8. The head-up display of claim 1, wherein the projector has exactly two image sources and exactly two optical components.

9. The head-up display of claim 1, wherein each respective one of the optical components has an aperture that is substantially the same as the one or more other optical components.

10. The head-up display of claim 1, wherein one or more of the optical components has an aperture and/or design that is different than one or more of the other optical components.

11. The head-up display of claim 1, wherein each one of the image sources is configured to produce an image in an image plane of the corresponding one of the optical components.

12. The head-up display of claim 1, wherein each one of the image sources is or comprises a cathode ray tube, a solid-state light source, a scanning laser, a micro-display image source, a liquid crystal on silicon (LCoS) display, a digital micro-mirror (DMD), and/or an organic light-emitting diode (OLED).

13. The head-up display of claim 1, wherein the optical combiner forms a windshield of a vehicle or a face shield of a helmet.

* * * * *